United States Patent
Heinrich et al.

(10) Patent No.: US 9,863,379 B2
(45) Date of Patent: Jan. 9, 2018

(54) VALVE FOR REGENERATION IN TURBOCHARGER OPERATION

(71) Applicant: Eagle Actuator Components GmbH & Co. KG, Weinheim (DE)

(72) Inventors: Ralf Heinrich, Schwegenheim (DE); Joerg Bittner, Novi, MI (US); Volker Daume, Hirschhorn (DE); Siegfried Driemer, Fuerth (DE)

(73) Assignee: EAGLE ACTUATOR COMPONENTS GMBH & CO. KG, Weinheim (DE)

( * ) Notice: Subject to any disclaimer, the term of this patent is extended or adjusted under 35 U.S.C. 154(b) by 85 days.

(21) Appl. No.: 14/952,955

(22) Filed: Nov. 26, 2015

(65) Prior Publication Data

US 2016/0177892 A1 Jun. 23, 2016

(30) Foreign Application Priority Data

Dec. 17, 2014 (DE) .......................... 10 2014 018 578

(51) Int. Cl.
*F02M 25/08* (2006.01)
*F02M 35/02* (2006.01)
(Continued)

(52) U.S. Cl.
CPC ........... *F02M 35/082* (2013.01); *F02B 33/40* (2013.01); *F02B 37/16* (2013.01);
(Continued)

(58) Field of Classification Search
CPC ............ F02M 25/0836; F02M 35/024; F02M 35/082; F02M 35/10157;
(Continued)

(56) References Cited

U.S. PATENT DOCUMENTS

| | | | | |
|---|---|---|---|---|
| 3,836,128 A | * | 9/1974 | Lunsford | F02M 23/04 261/39.2 |
| 6,343,594 B1 | * | 2/2002 | Koeslin | F02M 26/19 123/568.11 |

(Continued)

FOREIGN PATENT DOCUMENTS

| | | |
|---|---|---|
| DE | 102010044526 A1 | 5/2011 |
| DE | 102011084539 B3 | 12/2012 |

(Continued)

*Primary Examiner* — Audrey K Bradley
(74) *Attorney, Agent, or Firm* — Leydig, Voit & Mayer, Ltd.

(57) ABSTRACT

An arrangement that is as simple as possible and that has very few lines, has a valve with a base element having a regeneration nozzle in which a regeneration channel is formed, having an outflow nozzle in which an outflow channel is formed, and having a drive flow nozzle in which a Venturi tube is accommodated, whereby the regeneration channel, the outflow channel and the Venturi tube are flow-connected is characterized in that a closeable bypass channel is provided which opens up into the drive flow nozzle and which is configured there in such a way that a fluid that is flowing in through the regeneration channel can be discharged through the Venturi tube as well as through the bypass channel.

18 Claims, 9 Drawing Sheets

(51) Int. Cl.
*F02M 35/08* (2006.01)
*F02B 33/40* (2006.01)
*F02B 37/16* (2006.01)
*F02M 35/024* (2006.01)
*F02M 35/10* (2006.01)
*F02B 37/00* (2006.01)
*F01M 13/00* (2006.01)
*F01M 13/02* (2006.01)

(52) U.S. Cl.
CPC ...... *F02M 25/0836* (2013.01); *F02M 35/024* (2013.01); *F02M 35/10157* (2013.01); *F01M 13/0011* (2013.01); *F01M 2013/026* (2013.01); *F02B 37/00* (2013.01); *F02M 2025/0845* (2013.01)

(58) Field of Classification Search
CPC . F02M 2025/0845; F02B 33/40; F02B 37/00; F02B 37/16; F01M 13/0011; F01M 2013/026
See application file for complete search history.

(56) References Cited

U.S. PATENT DOCUMENTS

| | | | |
|---|---|---|---|
| 2003/0115871 A1* | 6/2003 | Feucht | F02D 9/104 60/605.1 |
| 2013/0104857 A1 | 5/2013 | Schulz | |
| 2013/0263590 A1 | 10/2013 | Kempf et al. | |
| 2014/0209709 A1 | 7/2014 | Bittner | |
| 2014/0251284 A1* | 9/2014 | Plymale | F02M 25/089 123/518 |
| 2015/0176542 A1* | 6/2015 | Balsdon | F02M 25/0836 137/888 |
| 2016/0061160 A1* | 3/2016 | Fletcher | F02M 35/10229 417/159 |

FOREIGN PATENT DOCUMENTS

| | | |
|---|---|---|
| DE | 102011054851 A1 | 5/2013 |
| DE | 102011086938 A1 | 5/2013 |
| DE | 102011104217 B4 | 7/2013 |
| DE | 102013206052 A1 | 10/2013 |
| DE | 102013021275 A1 | 7/2014 |

* cited by examiner

VALVE FOR REGENERATION IN TURBOCHARGER OPERATION

CROSS-REFERENCE TO RELATED APPLICATIONS

Priority is claimed to German Patent Application No. DE 10 2014 018 578.8, filed on Dec. 17, 2014, the entire disclosure of which is hereby incorporated by reference herein.

FIELD

The invention relates to a valve.

BACKGROUND

German patent (second publication) DE 10 2011 104 217 B4 discloses a valve of this type.

In particular, it is a known procedure to equip a turbocharger with a valve that has a regeneration channel, an outflow channel and a Venturi tube in order to regenerate an activated carbon filter. This is necessary because vapors coming out of a fuel tank leave behind their fuel fraction in the activated carbon filter.

In this context, an outflow nozzle can be flow-connected to a line through which the turbocharger draws in air through an air filter. For purposes of regenerating the activated carbon filter, the regeneration nozzle is connected to the activated carbon filter via a regeneration valve. The activated carbon filter is regenerated when the regeneration valve opens and outside air is drawn in through the activated carbon filter into an intake section of an engine. The drive flow nozzle containing the Venturi tube is connected to a drive flow line.

In the prior-art arrangements, several lines are provided with non-return valves in order to prevent the undesired return of gases or vapors from the turbocharger to the activated carbon filter when the latter is in a given mode of operation.

Before this backdrop, the invention is based on the objective of creating an arrangement that ensures that an activated carbon filter can be easily regenerated using a structure that is as simple as possible and that has very few lines.

SUMMARY

An aspect of the invention provides a valve, comprising a closeable bypass channel and a base element, the base element including: a regeneration nozzle in which a regeneration channel is formed; an outflow nozzle in which an outflow channel is formed; and a drive flow nozzle in which a Venturi tube is accommodated, wherein the regeneration channel, the outflow channel, and the Venturi tube are flow-connected, wherein the closeable bypass channel opens up into the drive flow nozzle, and wherein the closeable bypass channel is configured in the drive flow nozzle in such a way that a fluid that is flowing in through the regeneration channel can be discharged through the Venturi tube, as well as through the bypass channel.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
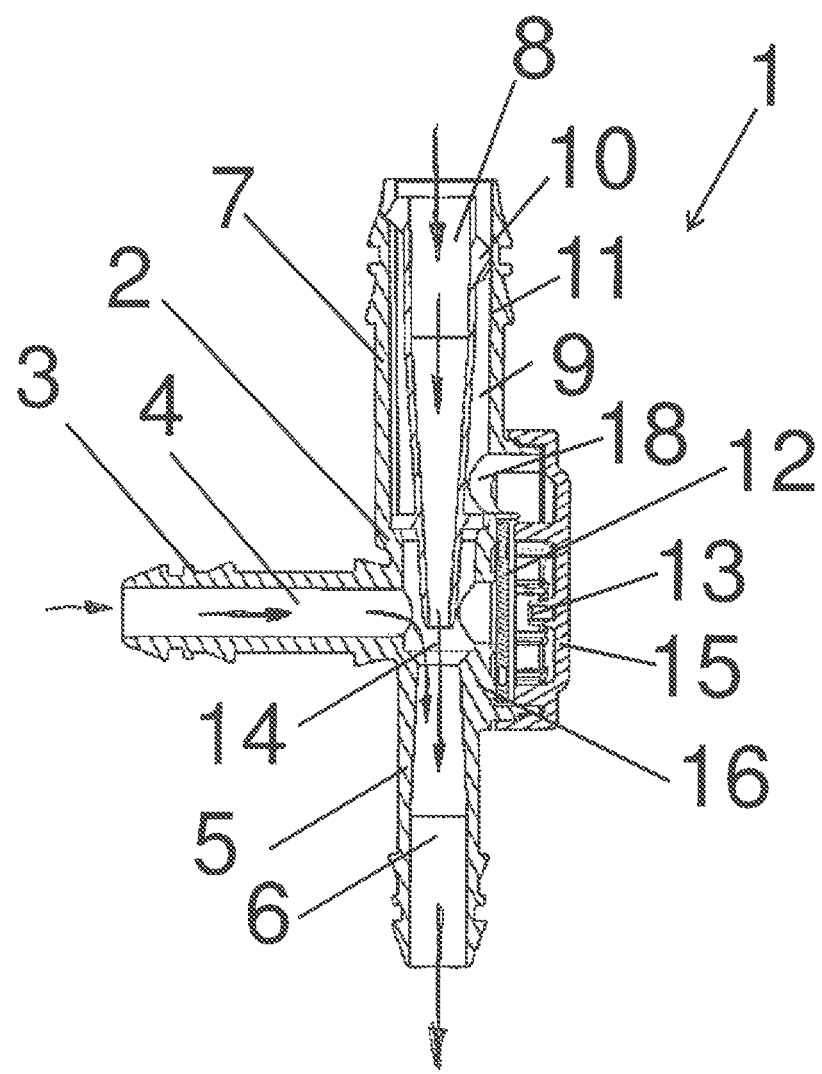
FIG. 1 a sectional view of a valve, in which the membrane closes off the bypass channel.

An aspect of the invention recognizes that a bypass channel can very quickly convey a flowing fluid away from the regeneration channel and carry it to the drive flow nozzle. This makes it possible to dispense with non-return valves and lines that prevent a flowing fluid from taking an undesired different path.

The bypass channel could be configured in certain areas or sections so as to be next to the Venturi tube in the drive flow nozzle. Pressure can be relieved very effectively in this manner since a fluid can be pressed into the Venturi tube, not only via its narrow part, but also into another channel, namely, the bypass channel. Since the bypass channel and the Venturi tube are integrated into the drive flow nozzle, a compact structure comprising only one drive flow nozzle is possible.

The bypass channel could be configured in certain areas or sections so as be concentric relative to the Venturi tube, thereby surrounding it. This creates a larger flow cross section for the bypass channel.

The Venturi tube could be supported against the inner wall of the drive flow nozzle by webs that protrude radially from the Venturi tube. The webs ensure that the position of the Venturi tube is fixed and that a sort of annular gap is maintained through which a fluid can flow out.

The bypass channel could be opened and closed by a non-return element. In this manner, the valve is configured as a non-return valve that can autonomously open or close the bypass channel as a function of the pressure conditions.

The non-return element could have a membrane or could be configured as a membrane that is articulated on a hinge. This allows the membrane to be folded up at one free end on one side while being held on the hinge side.

The membrane could rest against a stop. This prevents the membrane from being opened too far.

The non-return element could be arranged opposite from the regeneration nozzle. This translates into a simple production.

The bypass channel could run from a central area—into which the regeneration channel, the outflow channel and the Venturi tube open up—next to and/or into the Venturi tube into the drive flow nozzle. This allows a fast pressure relief since a flowing fluid can be quickly conveyed away from the outflow channel and into the bypass channel and/or into the Venturi tube.

A regeneration valve, preferably an electromagnetic regeneration valve, could be fluid-connected to the regeneration nozzle, whereby the valve and the regeneration valve are configured in one piece. This simplifies the assembly and can save on installation space. In particular, it is possible to cut down on the number of lines between the regeneration valve and the valve. Advantageously, one valve with just three connection nozzles is connected to the regeneration valve. Therefore, the configuration of the valve and the regeneration valve integrally in one piece creates an arrangement that, in addition, advantageously only needs or has at least three connection nozzles.

Before this background, a non-return valve could be fluid-connected to the outflow nozzle, whereby the valve and the non-return valve are configured in one piece. This likewise simplifies the assembly.

An arrangement could comprise a valve of the type described here as well as a turbocharger, whereby the outflow nozzle is fluid-connected to a non-return valve that is fluid-connected to a fresh air line of a turbocharger, and whereby the drive flow nozzle is fluid-connected to an intake section line leading to the intake section of an engine. Thanks to such an arrangement, it is possible to cut down on the number of lines. Particularly in the case of a structure with fewer lines, an activated carbon filter can be regenerated while in the intake mode as well as while in the charging mode of the engine.

FIG. 1 shows a valve 1, comprising a base element 2 having a regeneration nozzle 3 in which a regeneration channel 4 is formed, having an outflow nozzle 5 in which an outflow channel 6 is formed, and having a drive flow nozzle 7 in which a Venturi tube 8 is accommodated, whereby the regeneration channel 4, the outflow channel 6 and the Venturi tube 8 are flow-connected.

A closeable bypass channel 9 is provided which opens up into the drive flow nozzle 7 and which is configured there in such a way that a fluid that is flowing in through the regeneration channel 4 can be discharged through the Venturi tube 8 as well as through the bypass channel 9.

The bypass channel 9 is configured in certain areas or sections so as be next to the Venturi tube 8 in the drive flow nozzle 7. The bypass channel 9 is configured in certain areas or sections so as be concentric relative to the Venturi tube 8, thereby surrounding it.

The Venturi tube 8 is supported against the inner wall 11 of the drive flow nozzle 7 by webs 10 that protrude radially from the Venturi tube 8.

The bypass channel 9 can be opened and closed by a non-return element 12. The non-return element 12 is configured as a membrane that is articulated on a hinge. The membrane can rest against a stop 13.

The non-return element 12 is arranged opposite from the regeneration nozzle 3.

The bypass channel 9 runs from a central area 14—into which the regeneration channel 4, the outflow channel 6 and the Venturi tube 8 open up—next to the Venturi tube 8 into the drive flow nozzle 7.

For this purpose, a passage 18 is provided which allows a fluid to flow in the radial direction towards and next to the Venturi tube 8.

The regeneration channel 4 is arranged orthogonally to the outflow channel 6 and to the longitudinal axis of the Venturi tube 8. The non-return element 12 is accommodated inside a cover 15 that is ultrasound-welded to the base element 2. The cover 15 is opposite from the regeneration nozzle 3. The Venturi tube 8 is pressed into the drive flow nozzle 7.

FIG. 1 shows a sectional view of the valve 1, in which the membrane closes off the bypass channel 9. In this case, the Venturi tube 8 and the bypass channel 9 are charged with boost pressure from a turbocharger (not shown here).

On the one hand, the membrane is pressed against the base element 2 by the boost pressure that propagates via the bypass channel 9. On the other hand, the membrane is sucked against the base element 2, namely, against a seat 16 in the base element 2, by a negative pressure that prevails in the outflow channel 6, but also in the regeneration channel 4. As a result, the bypass channel 9 is flow-disconnected from the central area 14.

Air can now be drawn in through the regeneration channel 4 via an opened regeneration valve 19. An activated carbon filter can be regenerated in this process.

The direction of flow of the air or of a fluid is indicated by arrows in the figures.

Figure 2:
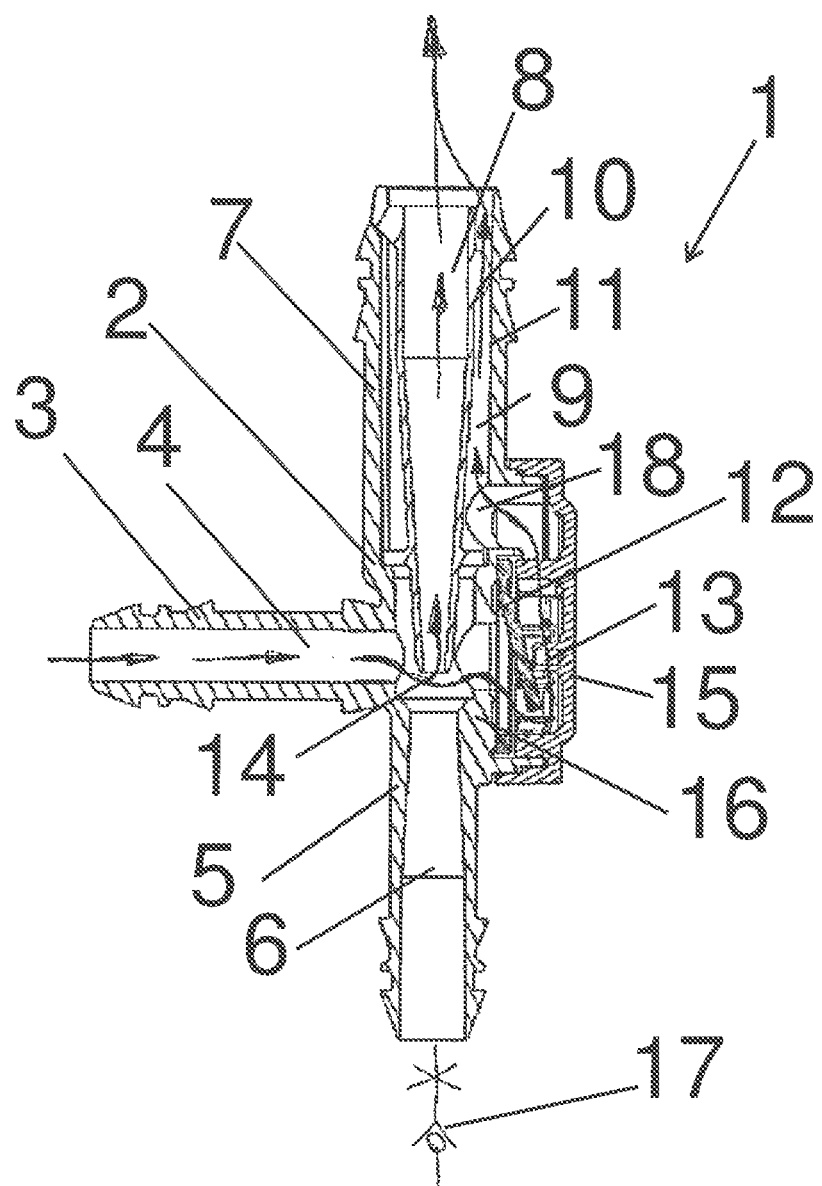
FIG. 2 a sectional view of the valve according to FIG. 1, in which the membrane is folded up on one side, it rests against the stop, and it frees the bypass channel.

FIG. 2 shows a sectional view of the valve 1 according to FIG. 1, in which the membrane is folded up on one side, it rests against the stop 13, and it frees the bypass channel 9. Air can now be conveyed from the regeneration channel 4 through the Venturi tube 8 but also, at the same time, through the bypass channel 9{,} inside the single drive flow nozzle 7 in the direction of an intake section of an engine 25.

Thus, an activated carbon filter can also be regenerated while in the intake operation of an engine 25.

In this process, a negative pressure is present in the outflow channel 6 and it closes off a non-return valve 17 that can be flanged onto the outflow channel 6 or else can be integrally configured with the latter.

Figure 3:
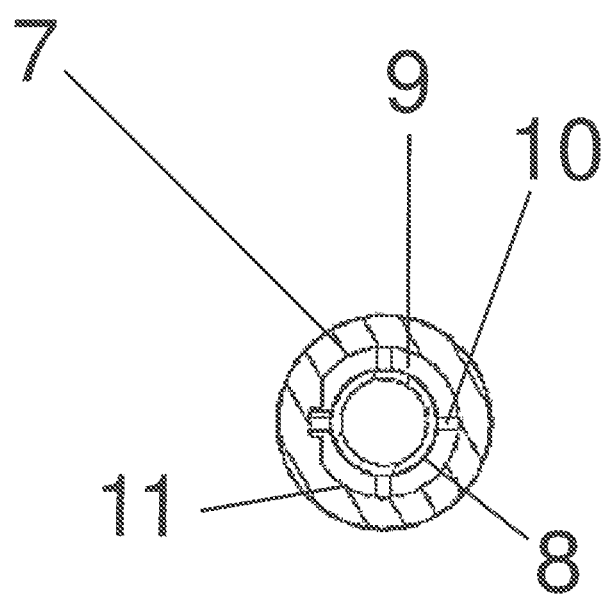
FIG. 3 a top view of the drive flow nozzle, showing that the Venturi tube is supported with four webs against the inner wall of the drive flow nozzle, thereby forming the bypass channel which runs next to the Venturi tube along the drive flow nozzle.

FIG. 3 shows a top view of the drive flow nozzle 7, showing that the Venturi tube 8 is supported against the inner wall 11 of the drive flow nozzle 7 by means of four equidistantly arranged webs, thereby forming the bypass channel 9, sections of which run next to the Venturi tube 8 along the drive flow nozzle 7. Concretely speaking, the bypass channel 9 is arranged concentrically relative to the Venturi tube 8 in this area.

Figure 4:
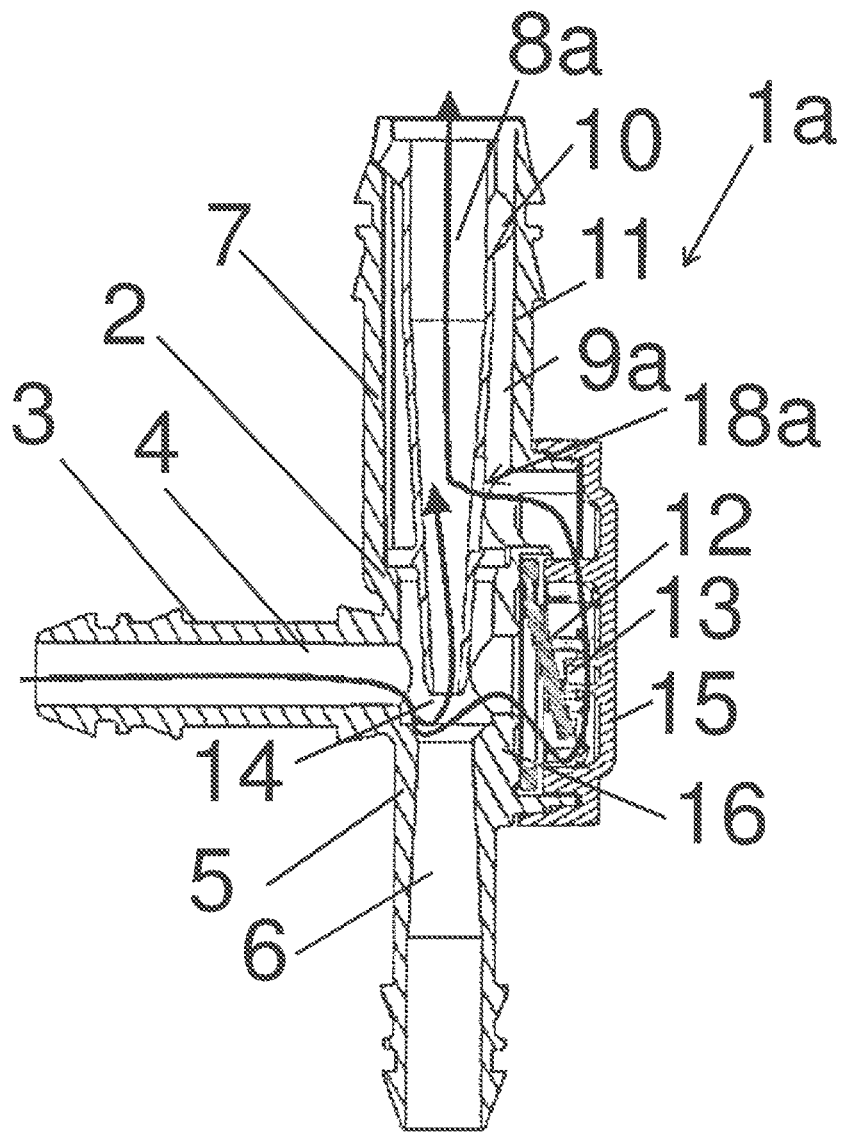
FIG. 4 a sectional view of another valve, in which the membrane is folded up on one side, it rests against the stop, and it frees the bypass channel, whereby a passage is formed in the Venturi tube and it connects the Venturi tube to the bypass channel in the radial direction.

FIG. 4 shows a sectional view of another valve 1a, in which the membrane is folded up on one side, it rests against the stop 13, and it frees the bypass channel 9a, whereby a passage 18a is formed in the Venturi tube 8a and it connects the Venturi tube 8a to the bypass channel 9a in the radial direction. As a result, the bypass channel 9a runs inside the Venturi tube 8a and next to the Venturi tube 8a.

Figure 5:
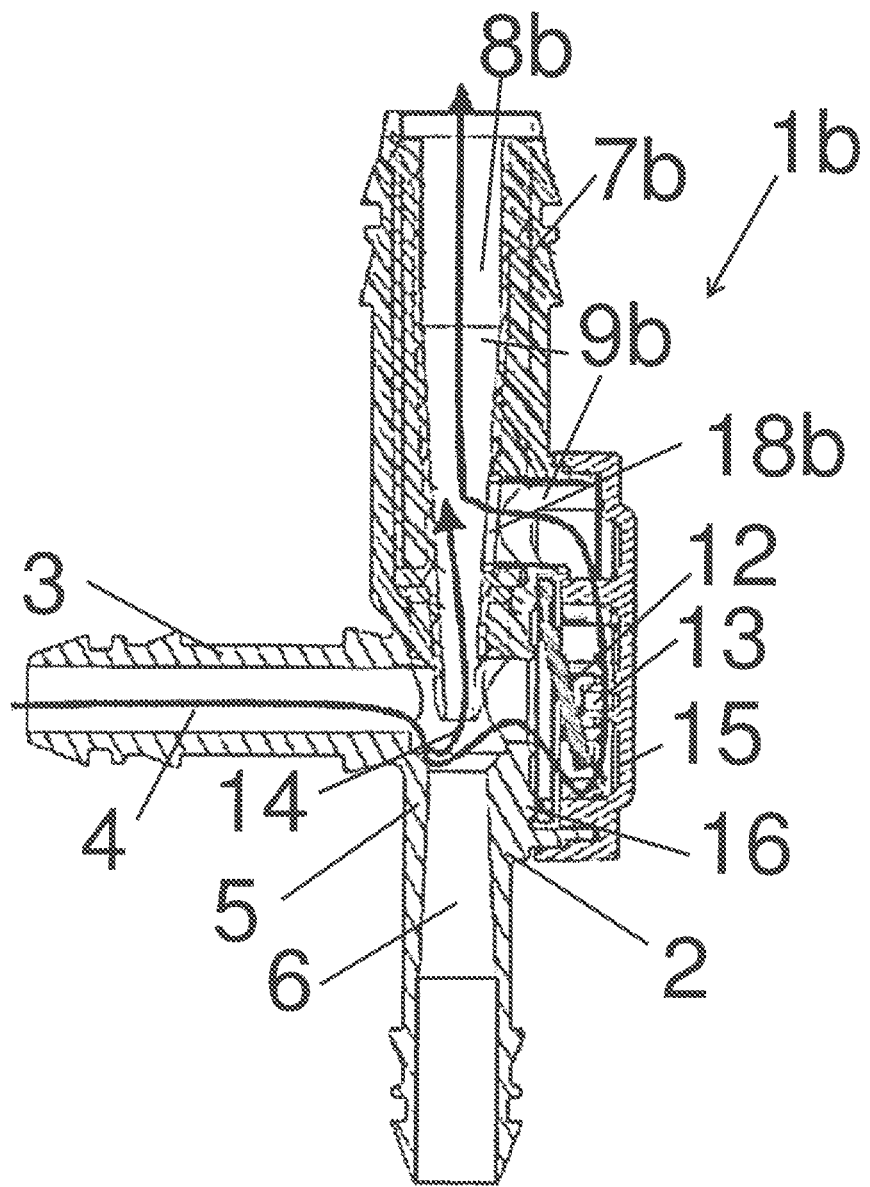
FIG. 5 a sectional view of another valve in which the membrane is folded up on one side, it rests against the stop, and it frees the bypass channel, whereby a passage is formed in the Venturi tube and it connects the Venturi tube to the bypass channel in the radial direction, and whereby the Venturi tube does not run next to the bypass channel along the drive flow nozzle.

FIG. 5 shows a sectional view of another valve 1b in which the membrane is folded up on one side, it rests against the stop 13, and it frees the bypass channel 9b, whereby a passage 18b is formed in the Venturi tube 8b and it connects the Venturi tube 8b to the bypass channel 9b in the radial direction, and whereby the Venturi tube 8b does not run next to the bypass channel 9b along the drive flow nozzle 7b. Here, the Venturi tube 8b is configured in one piece with the drive flow nozzle 7b in such a way that there is no longer any space for the bypass channel 9b next to the Venturi tube 8b along the drive flow nozzle 7b. As a result, the bypass channel 9b runs inside the Venturi tube 8b in this area.

Figure 6:
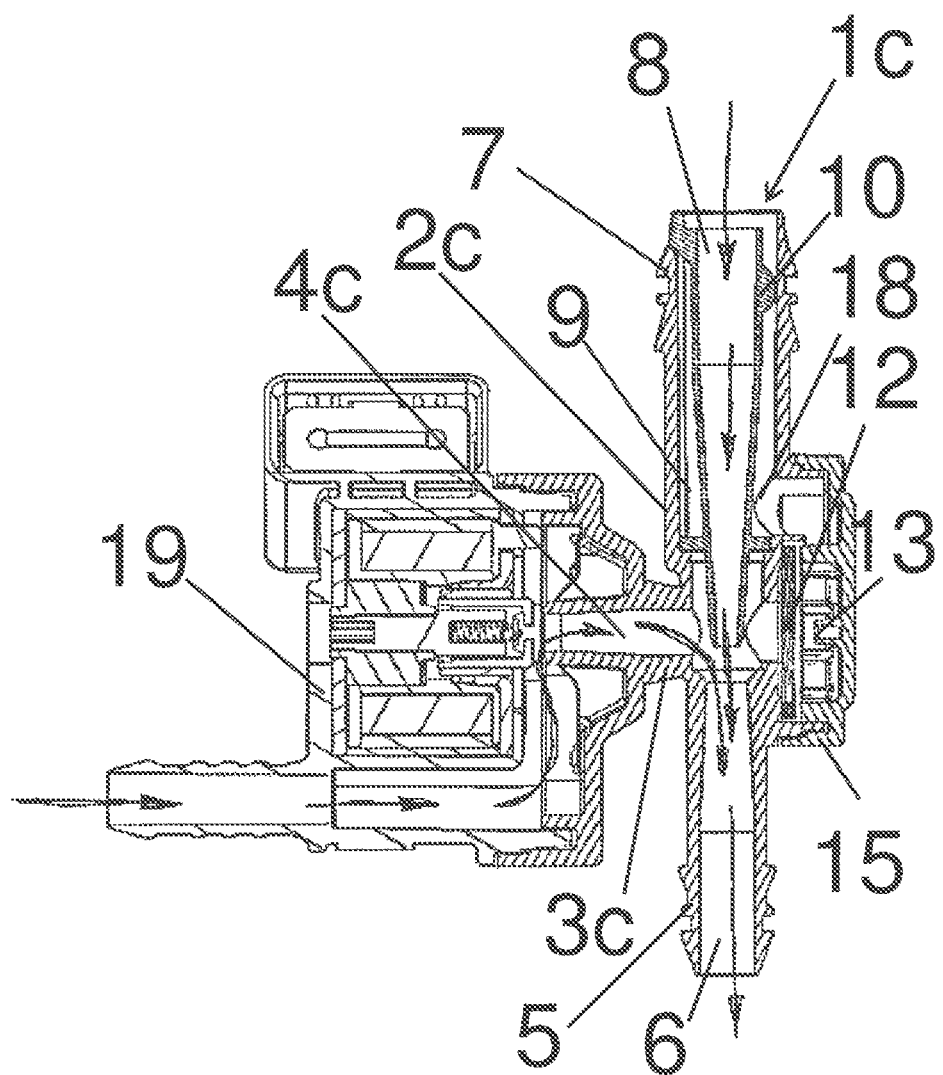
FIG. 6 a sectional view of a valve, in which the membrane closes off the bypass channel, whereby the regeneration nozzle is integrally configured with an electromagnetic regeneration valve.

FIG. 6 shows a sectional view of a valve 1c, in which the membrane closes off the bypass channel 9, whereby the regeneration nozzle 3c is integrally configured with an electromagnetic regeneration valve 19.

Figure 7:
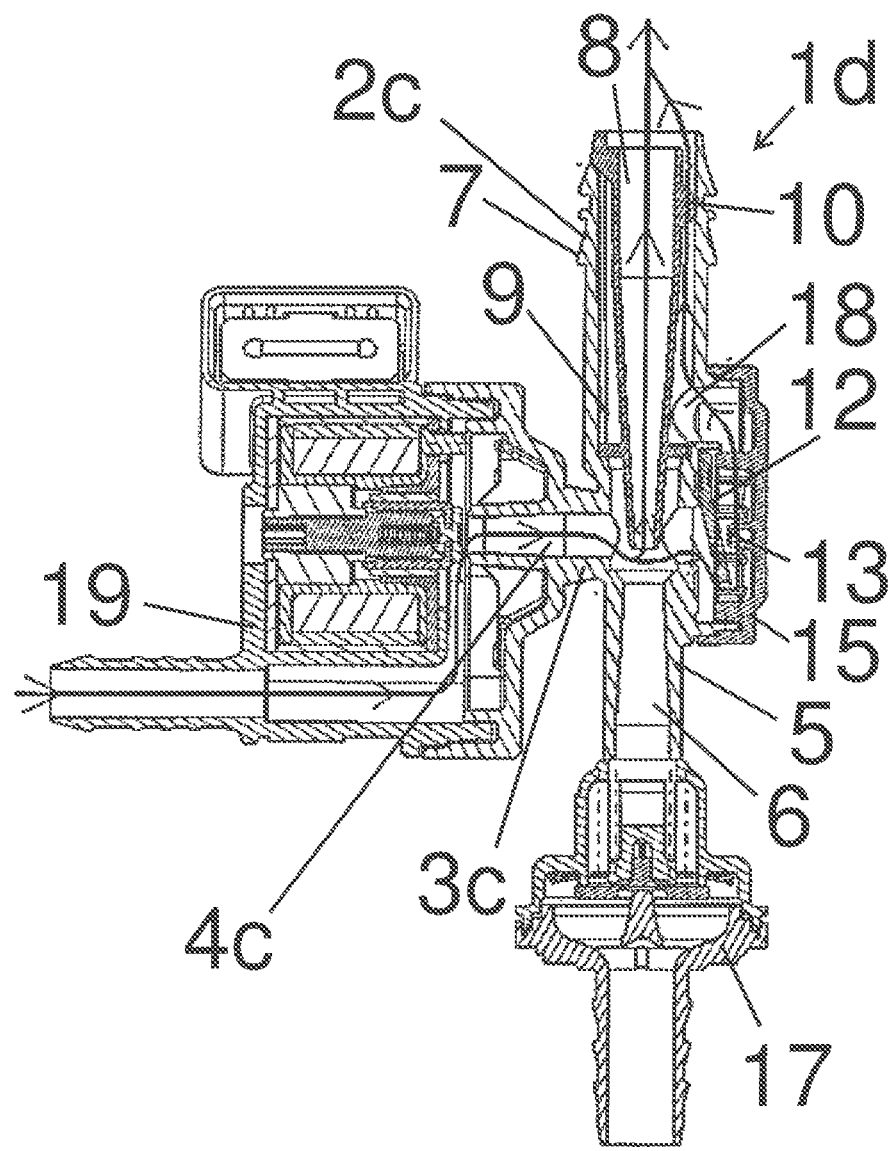
FIG. 7 a sectional view of a valve analogous to the one according to FIG. 6, in which the membrane is folded up on one side, it rests against the stop, and it frees the bypass channel, whereby a non-return valve is integrally configured with the outflow nozzle.

FIG. 7 shows a sectional view of a valve 1d, in which the membrane is folded up on one side, it rests against the stop 13, and it frees the bypass channel 9. A non-return valve 17 that is associated with the outflow nozzle 5 is closed.

Figure 8:
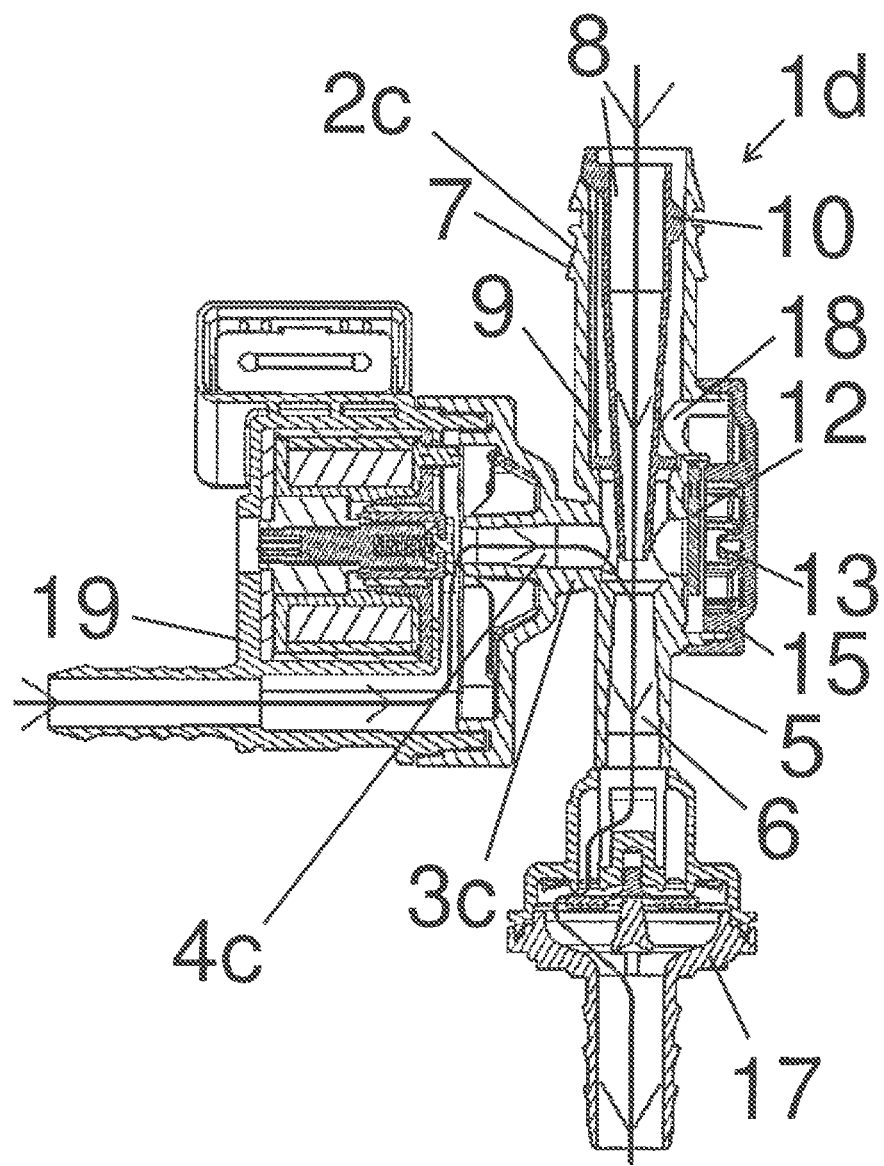
FIG. 8 a sectional view of the valve according to FIG. 7, in which the membrane does not free the bypass channel, but the non-return valve is open.

FIG. 8 shows a sectional view of the valve 1d according to FIG. 7, in which the membrane does not free the bypass channel 9. The non-return valve 17 that is associated with the outflow nozzle 5 is open.

FIGS. 6, 8 and 7 show the operating states that were described in conjunction with FIGS. 1 and 2. Concretely speaking, FIGS. 6 and 8 show the operating state according to FIG. 1, and FIG. 7 shows the operating state according to FIG. 2. The appertaining arrangements provide only one electromagnetic regeneration valve 19 or else also a non-return valve 17.

Concretely speaking, FIGS. 6, 7, and 8 show arrangements that comprise a valve 1c or 1d as well as a regeneration valve 19, whereby the regeneration valve 19 is fluid-connected to the regeneration nozzle 3c. The regeneration nozzle 3c is configured so as to be integral in one piece with the regeneration valve 19. A regeneration valve 19 is thus fluid-connected to the regeneration nozzle 3c, whereby the valve 1c or 1d and the regeneration valve 19 are configured in one piece.

FIGS. 7 and 8 show that a non-return valve 17 is fluid-connected to the outflow nozzle 5, whereby the valve 1d and the non-return valve 17 are configured in one piece.

Figure 9:
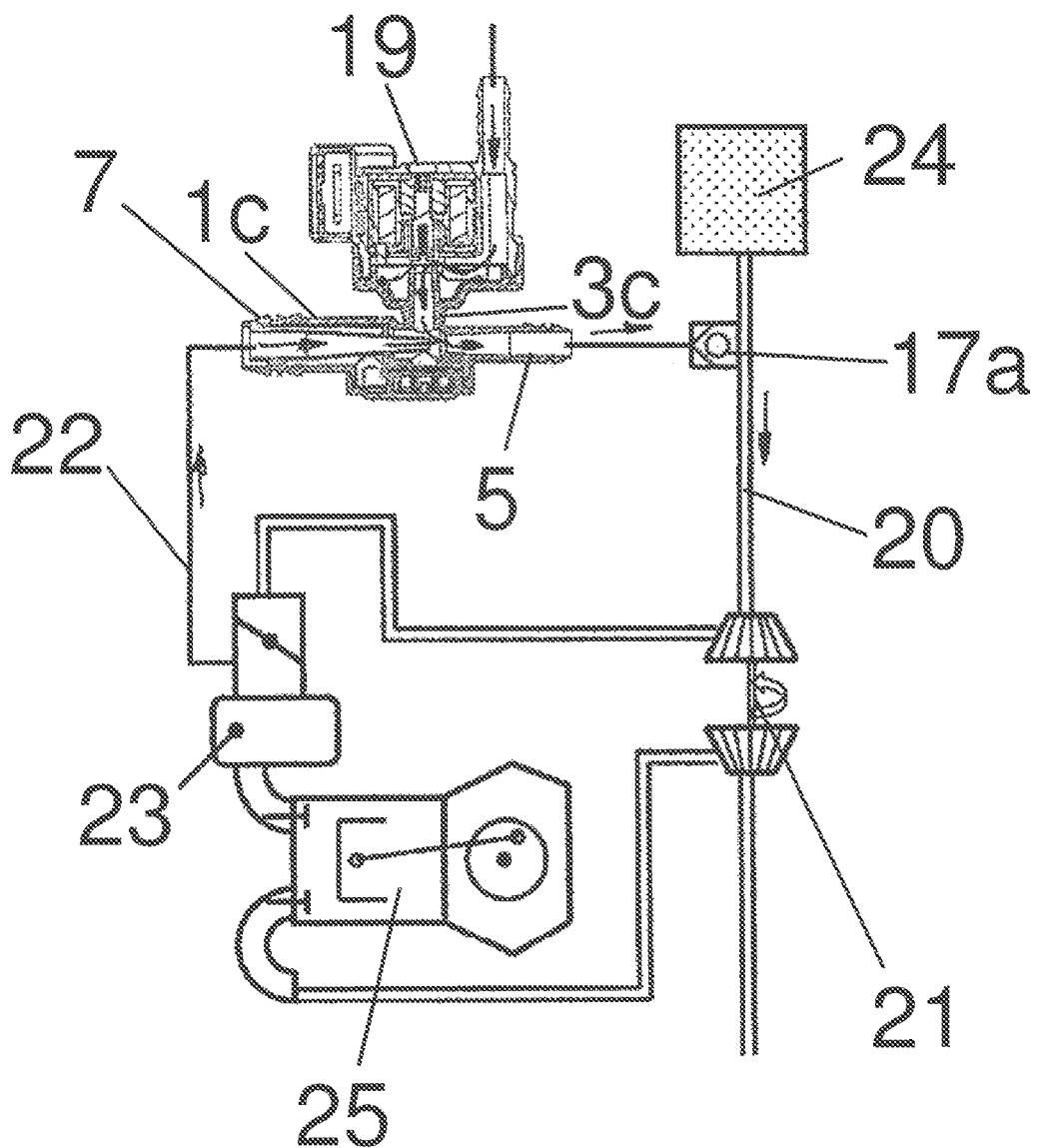
FIG. 9 an arrangement, comprising a turbocharger and a valve of the type described here.

FIG. 9 shows an arrangement comprising a valve 1c and a turbocharger 21, whereby the outflow nozzle 5 is fluid-connected to a non-return valve 17a that is fluid-connected to a fresh air line 20 of a turbocharger 21, and whereby the drive flow nozzle 7 is fluid-connected to an intake section line 22 leading to the intake section 23 of an engine 25.

Concretely speaking, the non-return valve 17a is directly associated with the fresh air line 20. As a result, the non-return valve 17a is arranged in the direct vicinity of the fresh air line 20. The non-return valve 17a is welded onto the fresh air line 20 or else firmly joined to it in some other manner. Thanks to this arrangement, the detection of the system described above is advantageously supported when it comes to completeness and correct connection. However, it is likewise conceivable for a non-return valve 17 to be joined in one piece and integrally to the outflow nozzle 5, as is shown in FIGS. 7 and 8.

The fresh air line 20 is supplied with fresh air that has passed through an air filter 24. The regeneration valve 19 is connected to an activated carbon filter (not shown here) in order to regenerate the latter.

The valve 1, 1a, 1b, 1c, described in the figures has only three connection nozzles oriented toward the outside or toward the other valves, namely, the regeneration nozzle 3, 3c, the outflow nozzle 5, and the drive flow nozzle 7.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A valve, comprising:
a closeable bypass channel; and
a base element, the base element including:
   a regeneration nozzle in which a regeneration channel is formed;
   an outflow nozzle in which an outflow channel is formed; and
   a drive flow nozzle in which both a Venturi tube and the closeable bypass channel are accommodated,
wherein the regeneration channel, the outflow channel, and the Venturi tube are flow-connected at a central area, and
wherein the closeable bypass channel is configured to flow-connect the central area and the drive flow nozzle such that fluid flowing from the regeneration channel into the central area is discharged from the valve out of the drive flow nozzle through both the Venturi tube and the bypass channel.

2. The valve of claim 1, wherein the bypass channel is configured in certain areas so as to be next to the Venturi tube in the drive flow nozzle.

3. The valve of claim 1, wherein the bypass channel is configured in certain areas so as to be concentric relative to the Venturi tube, thereby surrounding the Venturi tube.

4. The valve of claim 1, wherein the Venturi tube is supported against an inner wall of the drive flow nozzle by webs that protrude radially from the Venturi tube.

5. The valve of claim 1, wherein the bypass channel runs from the central area next to and/or into the Venturi tube.

6. The valve of claim 1, wherein the bypass channel runs from the central area into the Venturi tube.

7. The valve of claim 1, further comprising:
a regeneration valve fluid-connected to the regeneration nozzle,
wherein the valve and the regeneration valve are configured in one piece.

8. The valve of claim 1, further comprising:
a non-return valve fluid-connected to the outflow nozzle,
wherein the valve and the non-return valve are configured in one piece.

9. The valve of claim 1, wherein the bypass channel runs from the central area next to the Venturi tube.

10. The valve of claim 9, wherein the bypass channel further runs from the central area into the Venturi tube.

11. The valve of claim 1, wherein the bypass channel is configured to be opened and closed by a non-return element.

12. The valve of claim 11, wherein the non-return element is arranged opposite from the regeneration nozzle with respect to the central area.

13. The valve of claim 11, wherein the non-return element includes a membrane that is articulated on a hinge.

14. The valve of claim 13, wherein the membrane is configured to rest against a stop.

15. The valve of claim 11, wherein the non-return element is configured as a membrane that is articulated on a hinge.

16. The valve of claim 15, wherein the membrane is configured to rest against a stop.

17. An arrangement, comprising:
the valve of claim 1; and
a turbocharger,
wherein the outflow nozzle is fluid-connected to a non-return valve that is fluid-connected to a fresh air line of the turbocharger, and
wherein the drive flow nozzle is fluid-connected to an intake section line leading to an intake section of an engine.

18. A valve, comprising:
a closeable bypass channel; and
a base element, the base element including:
    a regeneration nozzle in which a regeneration channel is formed;
    an outflow nozzle in which an outflow channel is formed; and
    a drive flow nozzle in which a Venturi tube is accommodated,
wherein the regeneration channel, the outflow channel, and the Venturi tube are flow-connected at a central area,
wherein the closeable bypass channel is configured to flow-connect the central area and the drive flow nozzle such that fluid flowing from the regeneration channel into the central area is discharged from the valve out of the drive flow nozzle through both the Venturi tube and the bypass channel, and
wherein the bypass channel is configured in certain areas so as to be concentric relative to the Venturi tube, thereby surrounding the Venturi tube.

* * * * *